(12) United States Patent
Priefert

(10) Patent No.: US 11,382,443 B2
(45) Date of Patent: Jul. 12, 2022

(54) HEAVY DUTY DETACHABLE BEVERAGE AND PHONE HOLDER AND ASSOCIATED SYSTEMS AND METHODS

(71) Applicant: Priefert Mfg. Co, Inc., Mt Pleasant, TX (US)

(72) Inventor: Edward D. Priefert, Mt. Pleasant, TX (US)

(73) Assignee: Priefert Mfg. Co., Inc., Mt. Pleasant, TX (US)

( * ) Notice: Subject to any disclaimer, the term of this patent is extended or adjusted under 35 U.S.C. 154(b) by 0 days.

(21) Appl. No.: 16/712,418

(22) Filed: Dec. 12, 2019

(65) Prior Publication Data
US 2020/0229628 A1    Jul. 23, 2020

Related U.S. Application Data

(60) Provisional application No. 62/879,002, filed on Jul. 26, 2019, provisional application No. 62/778,707, filed on Dec. 12, 2018.

(51) Int. Cl.
*A47G 23/02* (2006.01)
*H04B 1/3877* (2015.01)
*A01K 7/00* (2006.01)

(52) U.S. Cl.
CPC ....... *A47G 23/0225* (2013.01); *H04B 1/3877* (2013.01); *A01K 7/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,829,353 A * | 10/1931 | Hogan | ................. | B67D 3/0083 248/143 |
| 2,200,024 A * | 5/1940 | De Sipio | ................. | A47K 5/12 222/162 |
| 3,982,716 A * | 9/1976 | Trees | ................. | A61M 5/1417 248/309.4 |
| 4,957,260 A * | 9/1990 | Shelley | .................... | A47K 5/18 141/352 |
| 5,745,565 A * | 4/1998 | Wakefield | ........... | B60R 11/0241 379/446 |
| 5,749,490 A * | 5/1998 | Keicher | ............... | B65D 23/003 215/396 |
| 6,193,202 B1 * | 2/2001 | Rogers | ..................... | A47C 7/68 248/106 |
| 6,808,149 B1 * | 10/2004 | Sendowski | .............. | A47K 5/13 211/75 |
| 7,445,185 B1 * | 11/2008 | Cicero | ................... | A47K 3/281 211/16 |
| 7,500,443 B1 | 3/2009 | Allen | | |
| 8,001,671 B2 * | 8/2011 | Mitchell | ........... | A47G 23/0225 29/525.01 |
| 8,967,562 B1 * | 3/2015 | Bileth | ................. | F16M 13/022 248/206.5 |

(Continued)

*Primary Examiner* — Monica E Millner
(74) *Attorney, Agent, or Firm* — Matthew Warner-Blankenship; Dentons Davis Brown, P.C.

(57) ABSTRACT

The disclosed apparatus, systems and methods relate to a durable, magnetic cup holder having one or more magnets disposed in a housing, such as a metal or steel housing. The magnetic cup holder can have more than one opening or lumen, so as to be configured to house both a drink and a mobile phone.

19 Claims, 11 Drawing Sheets

(56) References Cited

U.S. PATENT DOCUMENTS

| | | | |
|---|---|---|---|
| 9,157,573 B1 | 10/2015 | Zach et al. | |
| 9,282,842 B1* | 3/2016 | Brooks | F16M 13/022 |
| 9,357,829 B1* | 6/2016 | Ikier | A45F 3/46 |
| 9,682,738 B1* | 6/2017 | Silva | B62J 11/00 |
| 9,980,439 B2* | 5/2018 | Aller | A01G 9/02 |
| 10,429,005 B2* | 10/2019 | Patel | F16N 7/00 |
| 10,752,309 B2* | 8/2020 | Oste | B62J 11/00 |
| 2004/0084593 A1 | 5/2004 | Barfield | |
| 2004/0104320 A1* | 6/2004 | Exler | A47G 23/0225 |
| | | | 248/206.5 |
| 2004/0129747 A1 | 7/2004 | Maierholzner | |
| 2004/0173719 A1 | 9/2004 | Mitchell | |
| 2004/0245415 A1* | 12/2004 | Sun | H01F 7/0252 |
| | | | 248/206.5 |
| 2005/0006547 A1* | 1/2005 | Exler | A47G 23/0225 |
| | | | 248/311.2 |
| 2005/0056655 A1* | 3/2005 | Gary | A47G 19/2261 |
| | | | 220/737 |
| 2011/0303808 A1* | 12/2011 | Bileth | A47G 23/0266 |
| | | | 248/206.5 |
| 2015/0232158 A1* | 8/2015 | Bouse | F16B 2/08 |
| | | | 220/200 |
| 2015/0343956 A1 | 12/2015 | Hipshier et al. | |
| 2016/0198877 A1* | 7/2016 | Ni | A45F 3/16 |
| | | | 455/575.1 |
| 2016/0242564 A1 | 8/2016 | Cass | |
| 2016/0257255 A1 | 9/2016 | Gaudig et al. | |
| 2018/0099713 A1 | 4/2018 | Oste | |
| 2018/0244357 A1 | 8/2018 | Bouse | |
| 2018/0271310 A1* | 9/2018 | Klugh | A45C 13/28 |
| 2019/0014935 A1* | 1/2019 | Bergin | A47G 23/0225 |

* cited by examiner

HEAVY DUTY DETACHABLE BEVERAGE AND PHONE HOLDER AND ASSOCIATED SYSTEMS AND METHODS

CROSS-REFERENCE TO RELATED APPLICATION(S)

This application claims priority to U.S. Provisional Application No. 62/778,707 filed Dec. 12, 2018 and U.S. Provisional Application No. 62/879,002 filed Jul. 26, 2019 which are hereby incorporated by reference in their entirety under 35 U.S.C. § 119.

TECHNICAL FIELD

The disclosed technology relates generally to a detachable cup or bottle holder, and in particular, to the devices, methods, and design principles allowing for a durable, detachable cup and bottle holder for use in indoor and outdoor applications. In certain implementations, the technology further features a lumen configured to contain an additional object or device, such as a cell phone or tablet.

BRIEF SUMMARY

Discussed herein are various devices, systems and methods relating to a holder, and more specifically a detachable, magnetic cup, bottle and/or device holder.

Example 1 is directed to a detachable cup holder having a housing comprising a lumen sized to accept a beverage container and a mounting plate comprising at least one magnet. The detachable cup holder of Example 1 where the mounting plate and housing are fixedly attached. The detachable cup holder of Example 1, further including a base plate including at least one opening. The detachable cup holder of Example 1, further including a mounting bracket defining at least one magnet opening. The detachable cup holder of Example 1, where the housing further includes an outer portion and an inner portion. The detachable cup holder of Example 1, where the outer portion and inner portions are curved, and the outer portion further includes at least one wing. The detachable cup holder of Example 1, where the lumen is sized to accommodate a livestock water bottle and at least one of base plate opening is sized to accommodate a water tube. The detachable cup holder of Example 1, further including a second lumen disposed between the first lumen and mounting bracket. The detachable cup holder of Example 1, where the second lumen is sized to accommodate a mobile phone.

Example 2 is directed to a magnetic cup and phone holder including a housing comprising: a first lumen, a second lumen, and at least one magnet, wherein the detachable cup holder is configured to be magnetically coupled, the first lumen is sized to accept a beverage container, and the second lumen is sized to accept a mobile device. The detachable cup holder of Example 2, also including a first lumen. The detachable cup holder of Example 2, also including a second lumen. The detachable cup holder of Example 2, also including at least one magnet. The detachable cup holder of Example 2, wherein the detachable cup holder is configured to be magnetically coupled. The detachable cup holder of Example 2, wherein the first lumen is sized to accept a beverage container. The detachable cup holder of Example 2, including a mounting plate, where the second lumen is disposed between the first lumen and the mounting plate. The detachable cup holder of Example 2, including where the housing further includes a curved outer portion and an inner portion. The detachable cup holder of Example 2, including at least one liner. The detachable cup holder of Example 2, including where the liner is removable. The detachable cup holder of Example 2, including a base plate including at least one opening.

Example 3 is directed to a magnetic holder for a beverage and a phone, including a housing including inner and outer portions defining a beverage lumen therein and a mounting plate comprising one or more magnets and defining a mobile phone lumen with the inner portion. The magnetic holder of Example 3 where the housing is steel. The magnetic holder of Example 3 where the housing is plastic. The magnetic holder of Example 3 further including at least one removable liner. The magnetic holder of Example 3 further including at least one wing.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1A:
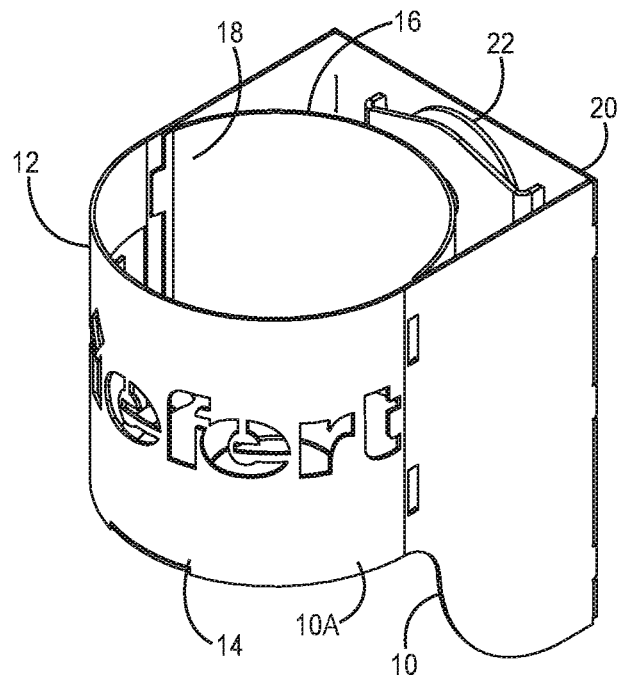
FIG. 1A is a three-quarters view of the holder, according to one implementation.

The various embodiments disclosed or contemplated herein relate to a detachable holder 10 for beverages, phones and other personal items. The assembled holder 10 shown in FIGS. 1A-1D has a housing 12 comprising curved portions 14, 16 and defining an internal lumen 18 constructed and arranged to house a cup, can or bottle, such as a medicine bottle or beverage. It is appreciated that while the housing 12 of FIGS. 1A-1D is curved, other shapes defining the lumen are of course possible. In these implementations, the housing 12 further comprises a mounting plate 20. It is appreciated that the housing 12 may be metal, plastic or other firm materials known in the art.

Figure 1B:
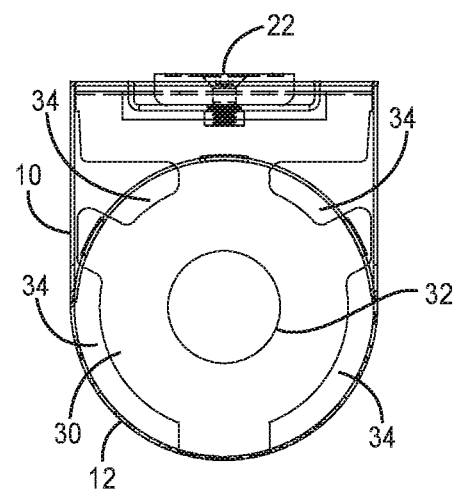
FIG. 1B is a top view schematic of the implementation of FIG. 1A.
Figure 1C:
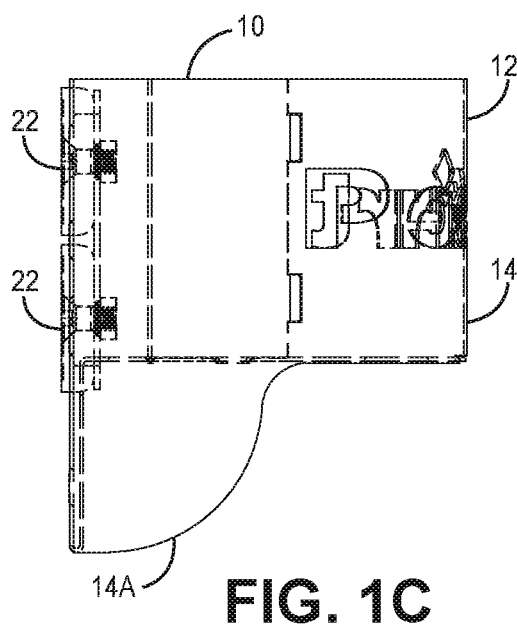
FIG. 1C is a side view schematic of the implementation of FIG. 1A.
Figure 1D:
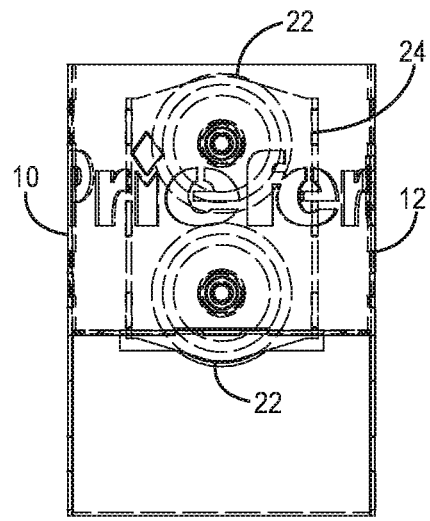
FIG. 1D is a front view schematic of the implementation of FIG. 1A.
Figure 2A:
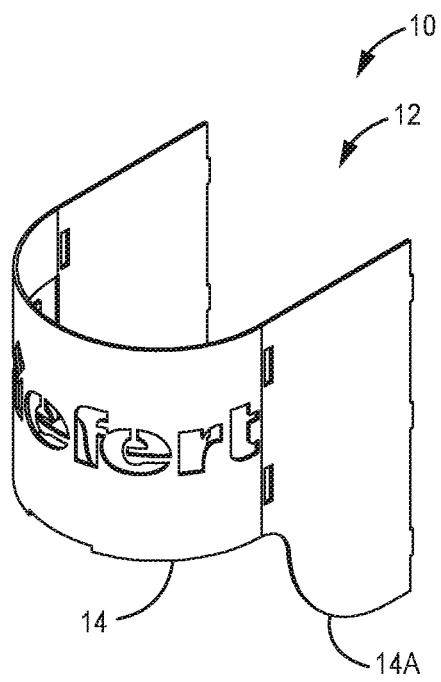
FIG. 2A is a three-quarters view of the outer portion, according to one implementation.
Figure 3:
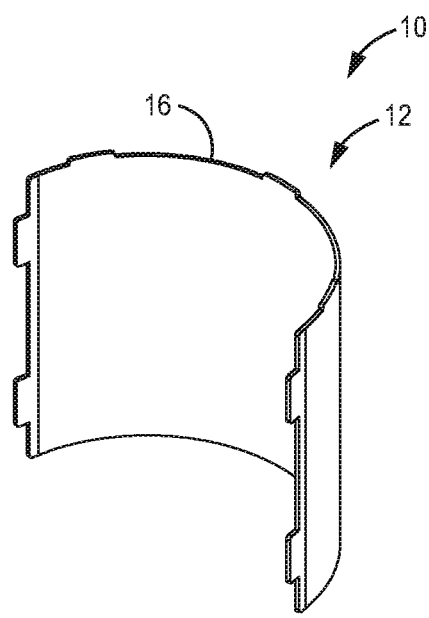
FIG. 3 is a three-quarters view of the inner portion, according to one implementation.
Figure 2B:
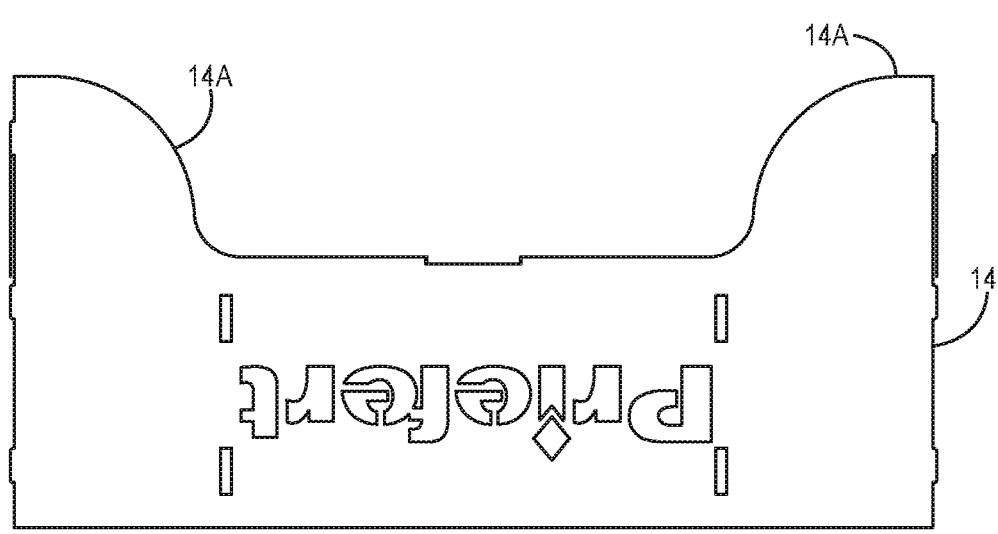
FIG. 2B is flat schematic view of the outer portion, according to one implementation.

FIGS. 2A-2B and FIG. 3 depict the holder's 10 outer housing portion 14 (FIGS. 2A-2B) and inner housing portion 16 (FIG. 3) of the implementations of FIGS. 1A-1B. In certain implementations, the outer portion 14 is curved and comprises one or more downward extensions 14A constructed and arranged to provide greater stability when securing the holder 10 to an implement. These downward extensions 14A or wings 14A are arranged on either side of the holder 10 so as to extend downwardly therefrom along the extended mounting plate 20 provide additional leveraged support, particularly when the holder 10 and/or its contents are of considerable weight. That is, the wings 14A provide additional support and security to the cup holder 10 when magnetically mounted or secured in a substantially upright position.

Continuing with FIG. 3, and as shown in FIGS. 1A-1D and elsewhere, the inner portion 16 of the holder 10 is curved and constructed and arranged to define the lumen 18. It is appreciated that these portions 14, 16 according to certain implementations are sized so as to define a lumen 18 that is constructed and arranged to contain a beverage container such as a can, bottle or cup, such as a soda or beer can, water bottle or coffee cup and the like, including reusable coffee or other beverage cups, such as those made by YETI®, Thermos® and other producers recognized in the art.

Figure 4A:
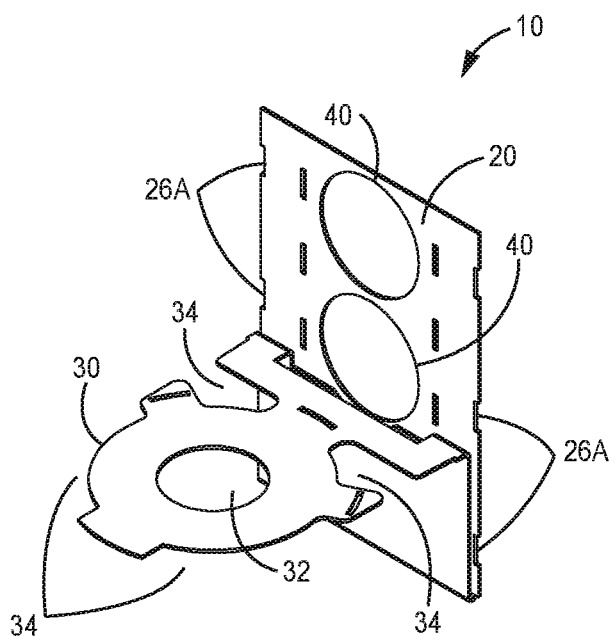
FIG. 4A is a three-quarters view of the mounting plate, according to one implementation.
Figure 4B:
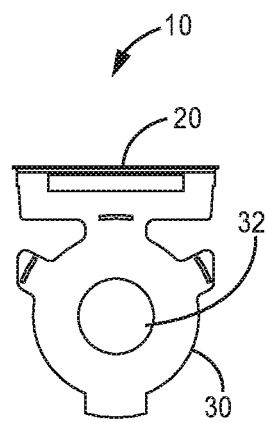
FIG. 4B is a top view of the mounting plate of FIG. 4A.
Figure 5:
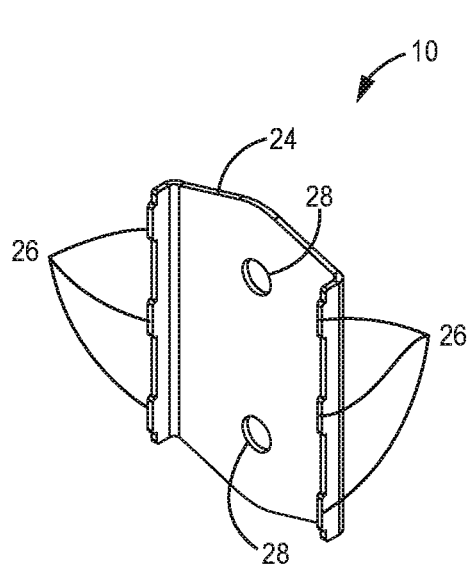
FIG. 5 is a three-quarters view of the mounting bracket, according to one implementation.
Figure 6:
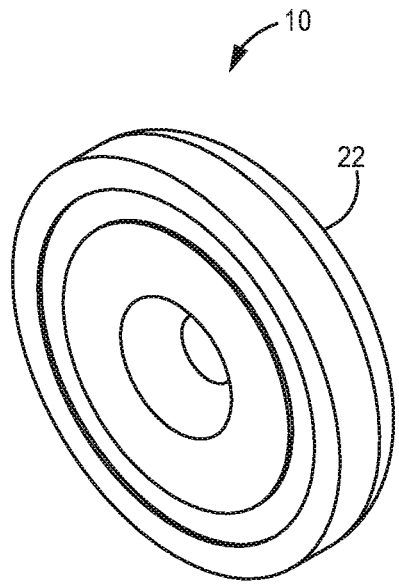
FIG. 6 is a three-quarters view of a magnet, according to one implementation.

Continuing with FIGS. 4A-5, the mounting plate 20 according to implementations such as those shown in FIGS. 1A-1D carries one or more magnets 22 (shown, for example in FIG. 6) disposed on a mounting bracket 24 affixed to the mounting plate 20.

As shown in the implementation of FIG. 4A and elsewhere, the holder 10 has an optional base plate 30 having on or more openings 32, 34 such as an optional central opening 32 and optional side openings 34. In these and other implementations, the optional base plate 30 is suspended at the lower end 10A of the cup holder internal lumen 18. It would be appreciated by those of skill in the art that the base plate 30 can be structurally integrated with the mounting plate 20, such as by having the shape of the base plate 30 cut extending from one end of the mounting plate 20 and angled perpendicularly therefrom, as is shown.

An optional mounting bracket 24 is shown in detail in FIG. 5. In various implementations, the mounting bracket 24 has a plurality of mounting points 26 that are constructed and arranged to securely couple to corresponding mounting points 26A on the mounting plate (shown in FIG. 4A at 20). In some implementations, the mounting bracket 24 also includes one or more openings 28 for attachment of magnets 22, such as those shown in FIG. 6.

Figure 7:
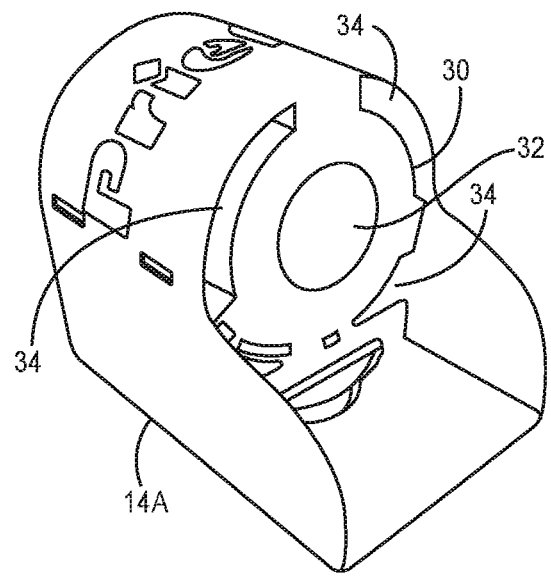
FIG. 7 is an underside perspective view of a holder implementation.

FIG. 7 depicts a further implementation of the magnetic holder 10 from the underside, showing possible positions of the various openings 32, 34 in the base plate when the holder 10 is assembled. It is appreciated that further arrangements are of course contemplated, and that the openings 32, 34 are optional and can be omitted in certain alternate implementations.

Figure 8:
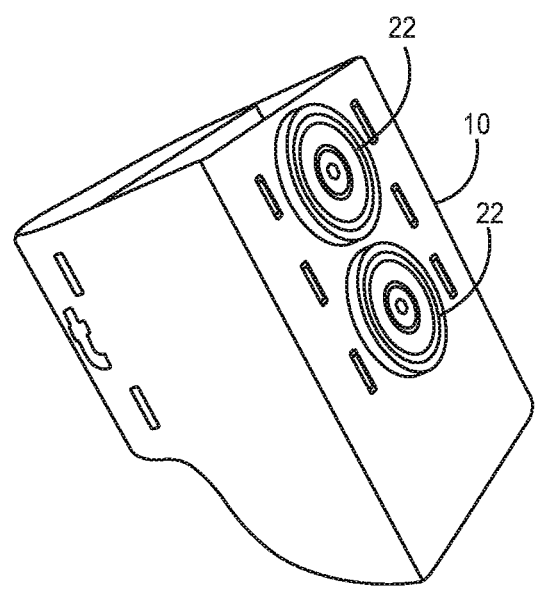
FIG. 8 is a rear perspective view of a holder implementation having two magnets.
Figure 12A:
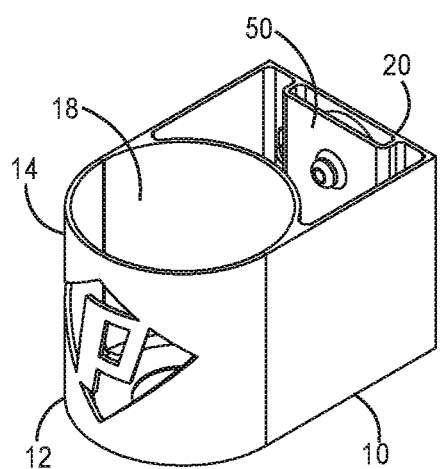
FIG. 12A is a three-quarters view of an implementation of a holder having a second lumen without wings and configured for holding a beverage container and mobile device.
Figure 12B:
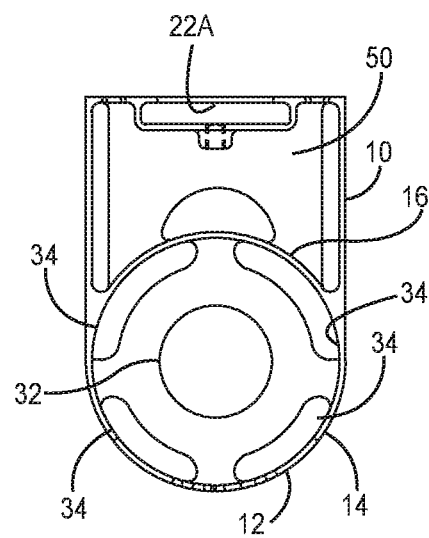
FIG. 12B is a top view schematic of the implementation of FIG. 12A.
Figure 12C:
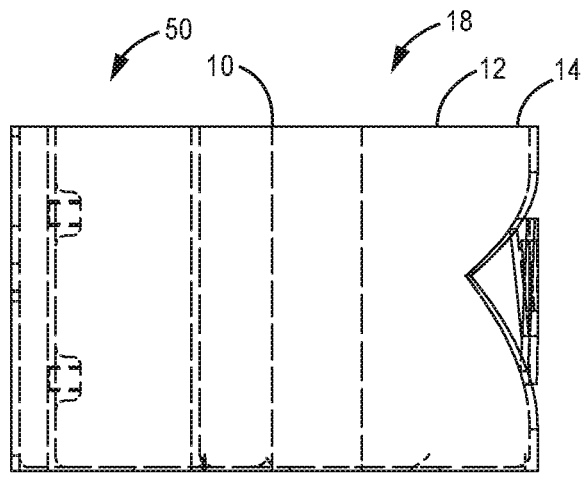
FIG. 12C is a side view schematic of the implementation of FIG. 12A.
Figure 12D:
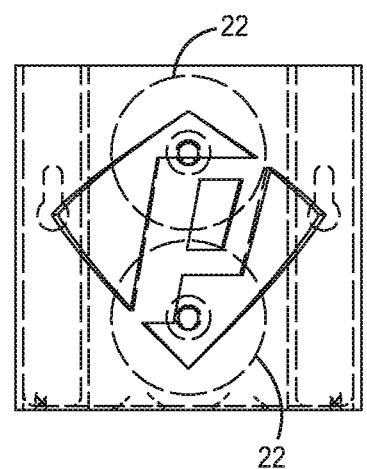
FIG. 12D is a front view schematic of the implementation of FIG. 12A.
Figure 12E:
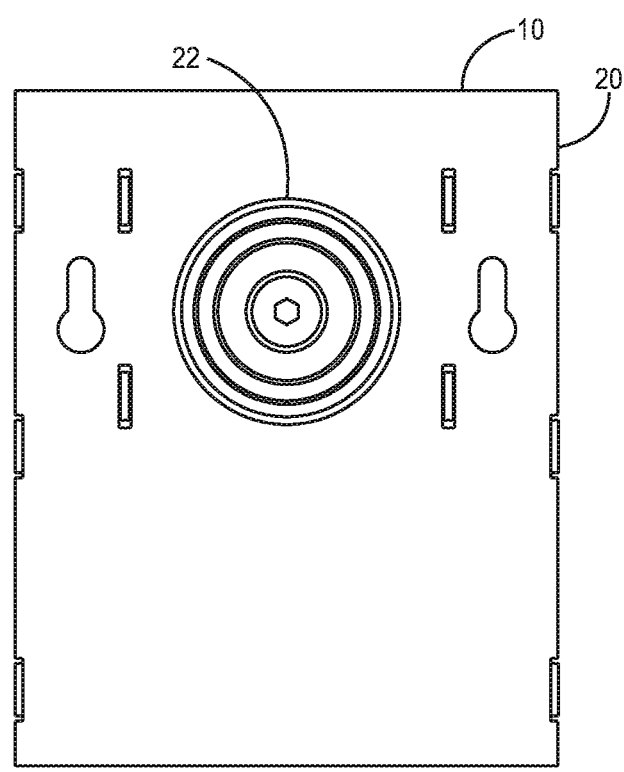
FIG. 12E is a rear view of the implementation of FIG. 12A having one magnet.

FIG. 8 depicts an assembled holder 10 from behind, showing an arrangement with two magnets 22. It is readily appreciated that alternate implementations can have a single magnet 22, such as is shown in the implementation of FIG. 12E. Various implementations have more than two magnets 22, and further implementations have magnets 22 of alternate shapes, such as squares, rectangles, triangles and the like, as would be readily understood.

Figure 9:
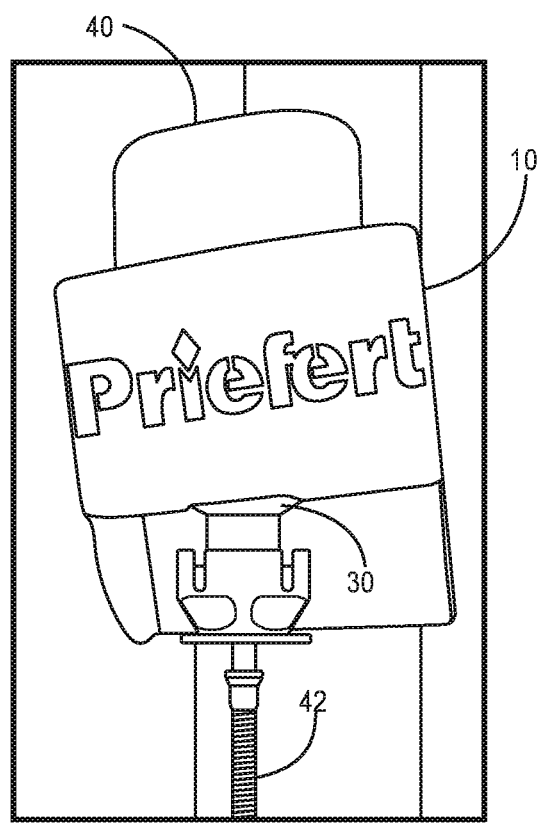
FIG. 9 is a three-quarters view of an implementation of a holder configured for holding a livestock water bottle.

It is understood that in various implementations, and as shown in FIG. 9, the holder 10 can be configured such that a bottle 40, such as a medicine bottle 40 or water bottle 40, can be placed within the lumen 18 so as to allow a tube 42 or other administration conduit can be routed out of the lumen 18 via one or more of the openings 32, 34 for use, such as in watering or administering medicine to animals. As would be readily appreciated, the sizing of the components discussed herein can be changed to accommodate industry-standard sizing or other sizing for a particular use.

Figure 10A:
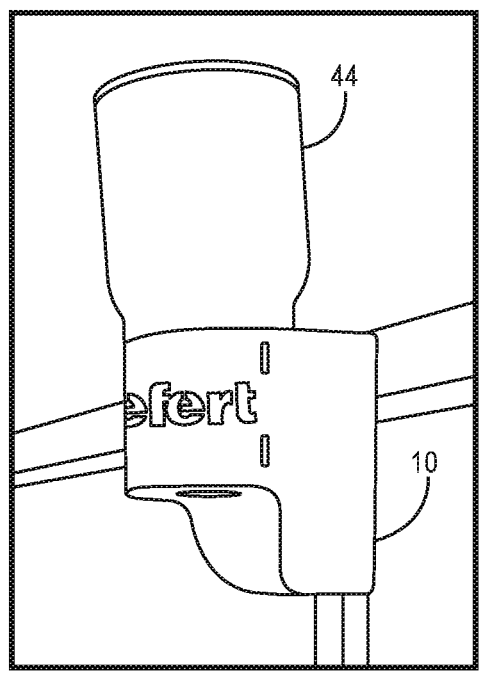
FIG. 10A is a three-quarters view of an implementation of a holder configured for holding a beverage container attached to a fence.
Figure 10B:
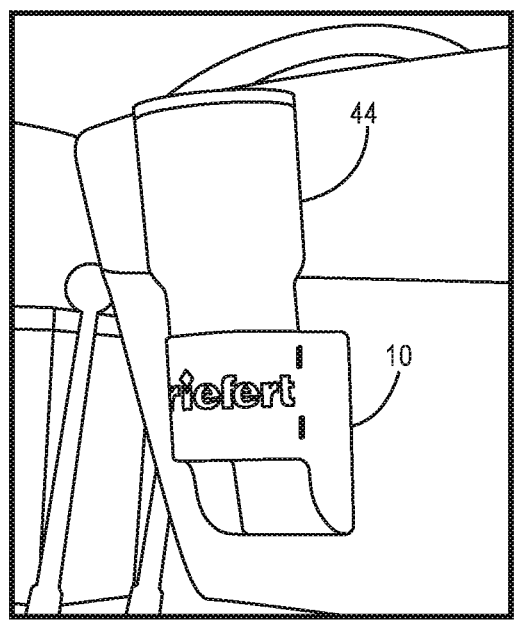
FIG. 10B is a three-quarters view of an implementation of a holder configured for holding a beverage container attached to a tractor.
Figure 11A:
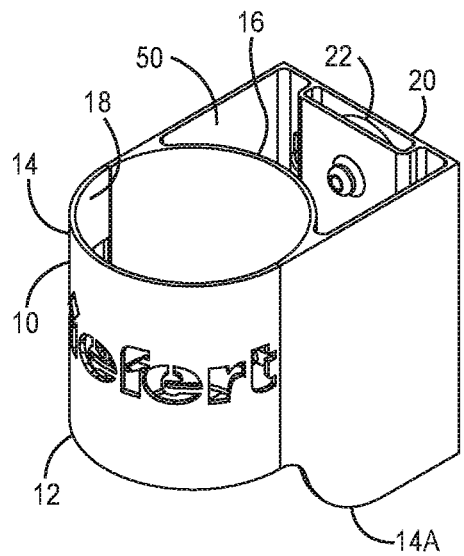
FIG. 11A is a three-quarters view of an implementation of a holder having a second lumen and wings and configured for holding a beverage container and mobile device.
Figure 11B:
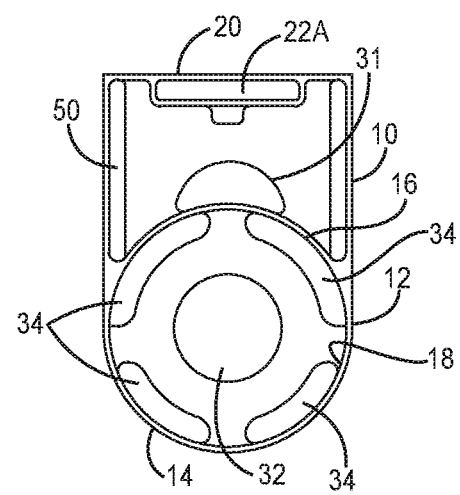
FIG. 11B is a top view schematic of the implementation of FIG. 11A.
Figure 11C:
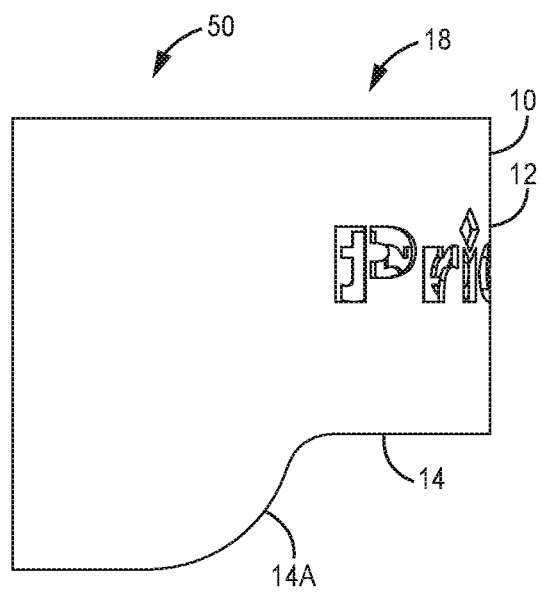
FIG. 11C is a side view schematic of the implementation of FIG. 11A.
Figure 11D:
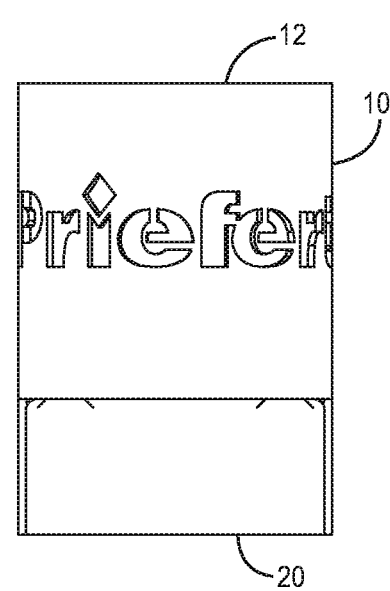
FIG. 11D is a front view schematic of the implementation of FIG. 11A.

FIGS. 10A-10 depict alternate uses of the holder 10. For example, FIG. 10A depicts an implementation of a holder 10 configured for holding a beverage container 44, wherein the holder 10 is magnetically attached to a fence. FIG. 10B shows an implementation of a holder 10 configured for holding a beverage container 44 attached to a tractor.

In the implementations of FIGS. 11A-14, the magnetic cup holder 10 further comprises first 18 and second lumens 50 so as to accommodate multiple objects, such as a beverage and a mobile phone or other device(s). It is readily appreciated that in certain applications, the ability to magnetically couple holder 10 having lumens 18, 50 for a beverage and a phone to an object—such as a lawn mower—for a period of time presents numerous advantages and flexibility to the user.

It will be appreciated by those of skill in the art that in these implementations, such as those shown in FIGS. 11A-11D, the first lumen 18 is adapted or otherwise sized to accommodate a bottle, beverage 44 or other drink or container, as described above, while the second lumen 50 is sized or otherwise constructed and arranged to accommodate a cell phone 54 or other personal electronic device.

In some implementations, the first lumen 18 and second lumen 50 are wholly separate such that there is no communication between the two lumens 18, 50. In various alternative, implementations, the holder 10 may include an opening 31 between the first lumen 18 and the second lumen 50 such that there is communication between the two lumens 18, 50. For example, such that a charging cord may be placed through an opening 31, 32, 34 into the lumen 18, 50. Of course various alternative implementations are possible. The example given is for illustrative purposes and should not be construed as limiting.

In other respects, the components of the two lumen 18, 50 holder 10 of FIGS. 11A-12E are similar to those of the one lumen holders 10 described above in relation to FIGS. 1A-2D and elsewhere. That is, these holders 10 have a housing 12 having optional outer 14 and inner 16 portions, optional wings 14A, a mounting plate 20 defining one or more magnet openings 22A and the like, as will be readily understood. It is further understood that while one magnet 22 is shown in FIG. 12E, alternate implementations may have two or more magnets 22, as shown in relation to FIG. 8 and FIG. 12D.

Figure 13:
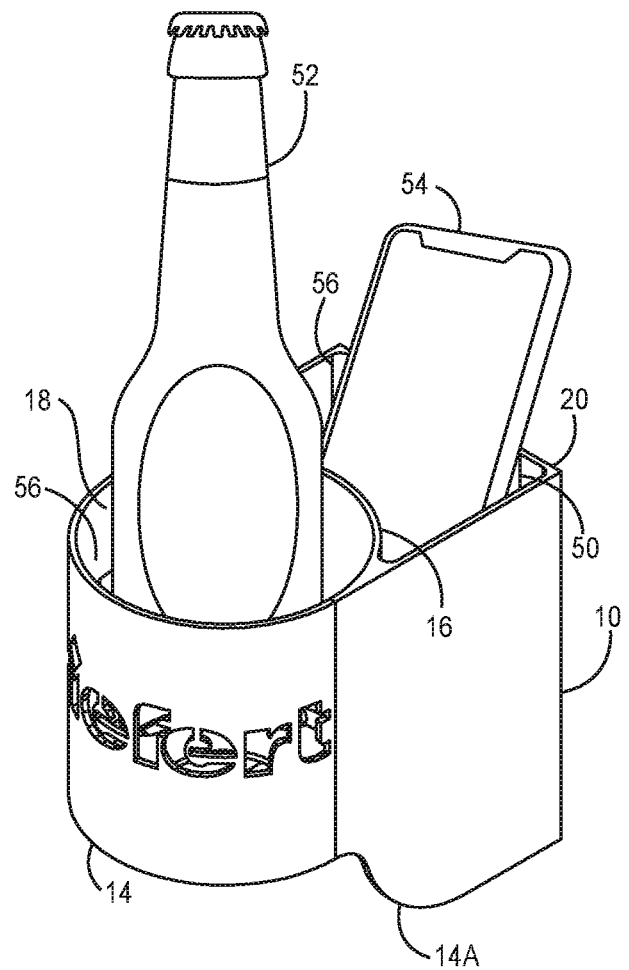
FIG. 13 is a three-quarters view of an implementation of a holder having a second lumen and wings and holding a bottle and mobile device.

Continuing with the implementations of FIGS. 11A-12E and as shown in FIG. 13, it is further understood that in various of these implementations, liners 56 and/or covers (not shown) can be inserted into the lumens 18, 50 so as to adapt them for a variety of desired purposes, such as reduction of vibration and/or thermal insulation for mobile devices and drinks, or to cover a lumen 18, 50 when not in use. It is appreciated that in various implementations, the liner 56 is made of neoprene, Styrofoam or other insulating material understood in the art. It is further understood that in certain implementations, the cover is made of plastic and sized to cover the lumen 18, 50 opening, as would be readily appreciated by those of skill in the art.

Figure 14:
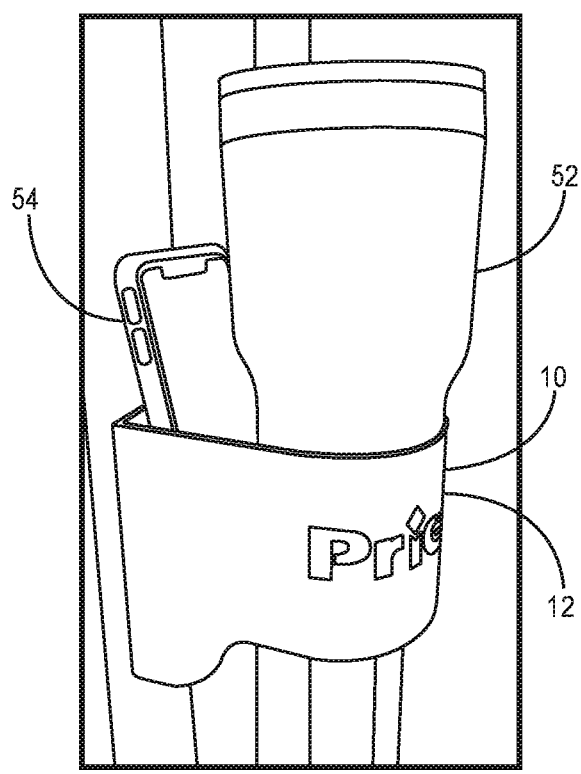
FIG. 14 is a three-quarters view of an implementation of a holder having a second lumen and wings and configured for holding a beverage container and mobile device.

It will be further appreciated that, in use according to these implementations and as shown in FIGS. 13 and 14, the holder 10 is thereby configured to hold both of a user's beverage container 44 and cellphone 54, the utility and advantages of which are readily apparent. For example, in one exemplary implementation, such a holder 10 may be mounted to a riding lawn mower such that the user has a cup and mobile phone holder to stow these objects for ready access while mowing. Further, because the holder 10 is magnetic, after mowing the user can detach it and move on to a subsequent task, such as in a garage or on other machinery. As such it is understood that in use, the holder 10 presents numerous advantages over the prior art. Namely, the holder 10 can be secured to a variety of indoor and outdoor implements, such as calf chutes, tractors, fences, mowers, or anything comprising ferromagnetic metals.

As has been described above, the holder 10 is constructed and arranged to be firmly secured to the attaching implement via the magnets 22 and overall structure. In certain implementations, the magnets 22 are 100 lb. magnets or more Other implementations using stronger or weaker magnets are of course possible and would be readily understood by those of skill in the art to vary depending on the desired application.

The cup holder 10 according to the various implementations described herein is also useful in numerous sporting applications, such as in rodeo chutes. That is, the cup holder 10 may be securely mounted to a rodeo chute such that mild jostling or other disruptions will not cause the cup holder 10 to become unsecured from the chute, but in the event that a larger impact is made against the holder, it will separate to prevent injury to riders and animals. Further similar uses will be appreciated in other sporting, agricultural and industrial applications.

Further, various implementations of the cup holder 10 are formed out of metal or other non-plastic materials so as to be highly resistant to ordinary wear and tear. Alternate implementations are made of plastic or other synthetic materials, which are lighter and easier to produce. Further application are of course possible.

Although the disclosure has been described with reference to preferred embodiments, persons skilled in the art will recognize that changes may be made in form and detail without departing from the spirit and scope of the disclosed apparatus, systems and methods.

What is claimed is:

1. A detachable cup holder comprising:
 (a) a curved housing defining an internal lumen;
 (b) a base plate affixed to the curved housing and forming an end of the internal lumen;
 (c) a mounting plate defining one side of the curved housing;
 (d) at least two downward extensions extending from the curved housing and engaged with the mounting plate; and
 (e) a least one magnet disposed on the mounting plate configured to releasably attach the detachable cup holder to a magnetic surface.

2. The detachable cup holder of claim 1, wherein the base plate is formed with the mounting plate and wherein the base plate extends perpendicular from the mounting plate.

3. The detachable cup holder of claim 1, wherein the base plate comprises one or more openings selected from a central opening and one or more side openings.

4. The detachable cup holder of claim 1, comprising two magnets in vertical alignment.

5. The detachable cup holder of claim 1, wherein the internal lumen comprises a first lumen and a second lumen.

6. The detachable cup holder of claim 5, wherein the first lumen is shaped to accommodate a beverage container and wherein the second lumen is shaped to accommodate a mobile phone.

7. The detachable cup holder of claim 6, further comprising an opening within the base plate shaped accommodate a cord to a mobile phone in the second lumen.

8. The detachable cup holder of claim 1, further comprising a liner inserted into the internal lumen, wherein the liner provides thermal insulation.

9. The detachable cup holder of claim 1, comprised of metal or plastic.

10. A magnetic beverage and mobile phone holder comprising:
 (a) a housing defining a first lumen and a second lumen, the housing comprising:
  (i) a curved portion;
  (ii) a mounting plate together with the curved portion forming an outside of the lumen;
  (iii) a base plate extending perpendicular from the mounting plate and affixed to the curved portion at one end and at least partially enclosing the first and second lumens; and
  (iv) two extensions extending from the curved portion and affixed at one side to the mounting plate; and
 (b) at least one magnet disposed on the mounting plate for releasable engagement of the housing to magnetic surfaces, wherein the first lumen is shaped to hold a beverage and wherein the second lumen is shaped to hold a mobile phone.

11. The magnetic beverage and mobile phone holder of claim 10, further comprising at least one removeable liner shaped to be inserted into the first lumen and provide thermal insulation.

12. The magnetic beverage and mobile phone holder of claim 10, wherein the at least one removable liner comprises neoprene.

13. The magnetic beverage and mobile phone holder of claim 10, wherein the housing is steel.

14. The magnetic beverage and mobile phone holder of claim 10, wherein the housing is plastic.

15. The magnetic beverage and mobile phone holder of claim 10, further comprising at least one opening in the base plate substantially in a center of the first lumen.

16. The magnetic beverage and mobile phone holder of claim 10, further comprising at least one opening in the base plate accommodating entrance into the second lumen.

17. The magnetic beverage and mobile phone holder of claim 10, wherein there is no communication between the first lumen and second lumen.

18. The magnetic beverage and mobile phone holder of claim 10, comprising two magnetics in vertical alignment.

19. A magnetic holder comprising a housing defining a first lumen and a second lumen, the housing comprising;
 (a) a first curved portion and a second curved portion defining the first lumen;
 (b) two outer portions, each comprising a wing extending therefrom;
 (c) a mounting plate defining a side of the housing and with the second curved portion and two outer portions defining the second lumen;
 (d) a base plate extending perpendicular to the mounting plate and engaged with the first curved portion, second curved portion, and two outer portions to partially enclose one end of the first lumen and second lumen;
 (e) one or more opening in the base plate configured for communication to internal portions of the first or second lumens; and
 (f) two magnets disposed on the mounting plate for releasable attachment of the magnetic holder to various surfaces.

* * * * *